US006947071B2

(12) United States Patent
Eichmann (10) Patent No.: US 6,947,071 B2
(45) Date of Patent: Sep. 20, 2005

(54) VEHICLE COMPARTMENT MONITOR (76) Inventor: Kirstin Eichmann, 6389 Timbers Ct., Mason, OH (US) 45040

( * ) Notice: Subject to any disclaimer, the term of this patent is extended or adjusted under 35 U.S.C. 154(b) by 223 days.

(21) Appl. No.: 10/293,569

(22) Filed: Nov. 13, 2002

(65) Prior Publication Data

US 2004/0090525 A1 May 13, 2004

(51) Int. Cl.⁷ .................................................. H04N 7/18
(52) U.S. Cl. ........................ 348/142; 348/148; 348/153; 348/158
(58) Field of Search ................................. 348/142–160; 340/539.1

(56) References Cited

U.S. PATENT DOCUMENTS 6,198,502 B1 * 3/2001 Watkins ...................... 348/148
6,480,616 B1 * 11/2002 Hata et al. ................... 382/106
6,570,609 B1 * 5/2003 Heien ......................... 348/148
6,585,384 B2 * 7/2003 Nielsen et al. ............... 359/877
6,696,943 B1 * 2/2004 Elrod et al. ............... 340/539.1
6,735,506 B2 * 5/2004 Breed et al. ................... 701/36
6,752,444 B2 * 6/2004 Kitano et al. ............. 296/184.1

OTHER PUBLICATIONS

One Step Ahead, catalog, One Step Ahead, Lake Bluff, IL, p. 3 (Winter 2005).
One Step Ahead, "Automobile Video Monitor", http://www.onestepahead.com/jump.jsp?IGen=detail&itemID=308775&itemType=PRODUCT&iMainCat=117&iSubCat=0&iProductID=308775&change=11 (2005).
Summer Infant, Inc., "Automobile Monitor" http://www.summerinfant.com/prod_monitors.html, (2005).

* cited by examiner

Primary Examiner—Andy Rao
(74) Attorney, Agent, or Firm—Brooks & Cameron, PLLC (57) ABSTRACT

The present invention includes devices, systems, and methods for providing a vehicle compartment monitoring system. The embodiments of the invention generally include a display, a camera, and a mechanism for relaying data signals from the camera to the display.

30 Claims, 4 Drawing Sheets

VEHICLE COMPARTMENT MONITOR

FIELD OF THE INVENTION

The present invention relates generally to communication devices, systems, and methods for use in vehicles and, in particular, to a compartment monitor for a vehicle.

BACKGROUND OF THE INVENTION

There are numerous challenges to effectively monitoring vehicle compartment activities while operating a vehicle. Generally, the operator of a vehicle needs to focus their attention on the control and external conditions surrounding the vehicle. As such, the operator of a vehicle is not able to focus any lengthy amount of attention to either the contents and/or passengers of the vehicle.

For example, the operator of an automobile must keep their eyes on the roadway to navigate and negotiate traffic. Devices such as rear and side view mirrors are designed and positioned so as to minimize the amount of time for which the driver must divert their attention from the road ahead. Some activities which could unsafely distract a vehicle operator from their navigation and traffic negotiation duties include when children or occupants are playing, roughhousing, misbehaving, requesting attention, or the like, while the vehicle is in motion. Traffic safety instructors regularly educate drivers not to be distracted by their passengers in a manner that they neglect their attention to the roadway.

In earlier times, there were no guidelines for the placement and restraint of children, and particularly infants, babies, and toddlers within a vehicle. Recently, studies have been performed and recommendations made that children be restrained in safety seats in the back seat of a vehicle, such as an automobile, and that they be positioned to face the back of a vehicle in which they are placed. Although it has been found that a child is significantly safer when restrained and positioned in this manner, problems arise because the adults when positioned in front of the child within the vehicle cannot see the child and the child cannot see the adults. This arrangement makes it difficult, for example, to ascertain the mood of the child, to see whether the child has lost a toy that he or she was holding, to see if the child has put an object in his or her mouth, to communicate with and reassure the child in response to the child's actions, and other such situations. This poses significant difficulties for the single occupant adult who is operating the vehicle.

For example, if the child is crying or sick, a natural response of the single occupant adult is to turn their attention to that individual and away from the roadway and traffic. In those cases where the child is in a rearward facing car seat, the problem is further complicated. That is, the single occupant adult, oftentimes the child's parent, cannot simply glance in the vehicle's rearview mirror to catch a glimpse of what is transpiring. Rather, the single occupant adult is required to divert their attention from the vehicle operation in a much more extensive manner, often physically turning their torso and arching backward over the back of the front passenger compartment's seat in an effort to observe what is occurring.

This activity, or distraction, is much too involved and time consuming for a driver to be able to safely continue vehicle operation on a roadway, whether on a highway or neighborhood street. And, oftentimes the alternative of simply pulling the vehicle over and stopping to inspect the situation is not a readily available option, such as, for example, when the vehicle is in the middle of several lanes of traffic on a high-speed freeway, when there is no time to pull off the roadway, when the roadway has no shoulder, or the shoulder is in poor condition, etc.

Even when a passenger is present in the front of the passenger compartment of a vehicle significant attention can be drawn by the movement of the passenger. The passenger's safety is also at greater risk. Traditionally, in these situations it was necessary for a passenger to unhook his or her seat belt and turn toward the back of the vehicle. Often, the passenger would need to bend over the seat to see the child. This movement is likely to put the passenger at a greater risk of injury in the event of an accident and will also likely attract the attention of the driver of the vehicle.

Another alternative is to have a person sit in the back seat with the child. There are many times in which the driver and the child are the only occupants of a vehicle and, therefore, this is not a practical choice in many situations.

One approach to resolve the above described conflicts of safe vehicle operation, navigation, and supervision of the vehicle compartment's occupants and contents has been to place or mount a mirror in the passenger compartment of the vehicle. In this fashion, the vehicle operator can use the mirror combination of the vehicle's rearview mirror and this additionally rear seat mounted mirror to observer the activities of a child in a rearward facing child seat in the rear passenger compartment of the vehicle.

Unfortunately, the observation capability will often not resolve the complication or difficulty the child is experiencing. For instance, when a child is crying they can simply need some form of visual contact with the parent. Under the above approach, the child may well not see their parent back by looking into the rear seat mounted mirror. Additionally, the rear seat mounted mirror can be jolted during travel, thus shifting the additional mirror out of the correct reflection alignment for proper observation. Further, the child seat and child can be located on the opposite side of the rear passenger compartment in the next car trip and, therefore, the mirror will need to be remounted to provide the correct reflected image.

Another problem with the above approach is that it does not provide the flexibility to operably select between two or more different focal points without physically moving the mirror. Additionally, this system can work in many vehicles, but not all vehicles have a back seat configuration that is suitable for mounting a mirror in a position to allow the driver to see the child. For example, the surface of the back seat can be too high to allow for proper placement of the mirror or the back seat can consist of bucket seating and therefore, there may not physically be a suitable place to mount the mirror.

The child also may not be positioned to provide a suitable view. For example, the child can be positioned directly behind the driver and, in some cases the mirror cannot be positioned to suitably see the child. Additionally, in many cases the rearview mirror needs to be adjusted to allow the driver to see the child. This adjustment can reduce the amount of traffic the driver can see. Therefore, it is generally desirable to have a display that is not positioned for viewing within the viewing area of the rearview mirror itself.

Furthermore, although the use of a mirror does allow the driver to see the child and also allows the child to see toward the front of the vehicle, the mirror does not provide the child with a view of the driver's face and, therefore, it can be difficult to effectively reassure a child with this approach. It would be desirable to have a system that allows for the driver to see the child and for the child to also see the driver.

For these and other reasons there continues to be a need for improved methods, systems, and apparatus for monitoring the occupant's and contents of a vehicle's interior compartments.

SUMMARY OF THE INVENTION

The present invention includes, among other things, improved methods, systems, and apparatus for monitoring the occupants and contents of a vehicle's interior compartments. The embodiments of invention afford a more safe and efficient manner for monitoring the interior of a vehicle.

The embodiments of the invention generally include a display, a camera, and a mechanism for relaying data signals from the camera to the display. The display is provided for displaying images for viewing by a person (a viewer), positioned within a compartment of a vehicle. The camera is positioned within the compartment of a vehicle and is provided to transmit data signals. The mechanism for relaying data signals from the camera to the display can be utilized to transmit data signals that contain images not viewable from an orientation of the viewer.

The mechanism for relaying data signals can be of any type known in the art, for example, both hardwired and carrier wave connection types are suitable types of connections between the camera and the display. Specifically, if a hardwired connection is desired, a coaxial cable is an example of a suitable connection mechanism. With regard to a carrier wave type connection, infrared, radio frequency, Bluetooth, and the like are some examples of common suitable wave types.

The camera can be equipped to have the capability to zoom in or out. Additionally, the camera can have the capability to pan horizontally and/or vertically, or a combination of the two.

Another embodiment includes a display, a camera, and two transceivers. The display is provided for displaying images for viewing by a person, positioned within a compartment of a vehicle. The camera is positioned within the compartment of a vehicle and the first transceiver, connected to the camera, is operable to transmit and receive data signals with the display. The second transceiver, connected to the display, is operable to transmit and receive data signals with the camera.

Another embodiment of the invention includes a plurality of cameras, such as a first camera and a second camera, and a display. Each camera can be operable to transmit or can be operable to transmit and receive data signals with the display. The display can be operable to receive or to transmit and receive data signals. Further, the display can be operable to display a first image from the first camera and a second image from the second camera. The display can also be operable to switch from displaying the first video image to displaying another video image. The display can also be operable to display the first and second video images simultaneously.

In another related embodiment, the system can also have a second display wherein the first camera and the first display form a first unit and wherein the second camera and the second display form a second unit. The camera component of the first unit can be operable to transmit to and/or receive data signals with the display component of the second unit and the camera component of the second unit is operable to transmit to and/or receive data signals with the display component of the first unit.

The one or more displays and/or one or more cameras can each be removably positionable. This can be useful for removing the items to reduce the likelihood of theft or for repositioning the items, for example. Whether the one or more displays and/or one or more cameras are removably positionable, fixed, or integrated into the structure of the vehicle, for most embodiments of the invention, the display is positioned in a front seating portion of a passenger compartment of the vehicle, while the camera is positioned in a back seating portion of the passenger compartment.

The present invention also includes a method of forming a vehicle monitoring system. The system includes the steps of locating a first unit having a camera and a display, locating a second unit having a camera and a display, and operatively coupling the first unit to the second unit such that the camera of the first unit and the display of the second unit can transmit and/or receive data signals from each other and such that the camera of the second unit and display of the first unit can transmit and/or receive data signals from each other. The step of locating the display can include removably positioning or fixing the display to the vehicle, or the display can be integrated into the vehicle in locations such as: into a dashboard of the forward passenger compartment of the vehicle, into a visor of the front passenger compartment of the vehicle, into a windshield of the front passenger compartment of the vehicle, into a rearview mirror of the front passenger compartment of the vehicle, and the like. Additionally, the camera can be removably positioned, fixed, or integrated within the vehicle including such locations as: into a back seat of the rearward passenger compartment of the vehicle, into an interior portion of the vehicle that defines the rearward passenger compartment of the vehicle, and the like.

The present invention also includes a method of monitoring a vehicle compartment. The method includes the steps of locating a first unit having a camera and a display, locating a second unit having a camera and a display, communicating data signals from the camera of the first unit to the display of the second unit, and communicating data signals from the camera of the second unit to the display of the first unit. The method can also provide that the communication of data signals is accomplished in real time. The method can also include the step of operatively coupling the first unit to the second unit such that the camera of the first unit can transmit data with the display of the second unit and such that the camera of the second unit can transmit data signals to the display of the first unit. Additionally, the camera of the first unit can be operable to receive data signals from the display of the second unit and the camera of the second unit can be operable to receive data signals from the display of the first unit. Additionally, the method can include the step of producing a video image on the first display and second display.

Additionally, in automobiles and in some other vehicles, it is becoming more popular to include a computer screen, a television, and/or a video monitor in a vehicle. These devices are utilized, for example, for running graphical navigational programs, receiving and displaying television signals, and playing video tapes and digital video recordings and playing computerized games. In vehicles equipped with these devices, it would be advantageous, for example, to be able to view a child in the back seat of the vehicle by transmitting a video image of the child to one of these display devices. It should be noted that the present invention provides embodiments in which these devices could be utilized as displays for use in a vehicle compartment monitoring system.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims.

DETAILED DESCRIPTION OF THE INVENTION

In the following detailed description of the invention, reference is made to the accompanying drawings which form a part hereof, and in which is shown, by way of illustration, specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense, and the scope of the present invention is defined only by the appended claims, along with the full scope of equivalents to which such claims are entitled. Used herein is a numbering convention in which the prefix digit references the figure number upon which the element is shown and a two digit suffix represents common elements between figures.

Figure 1:
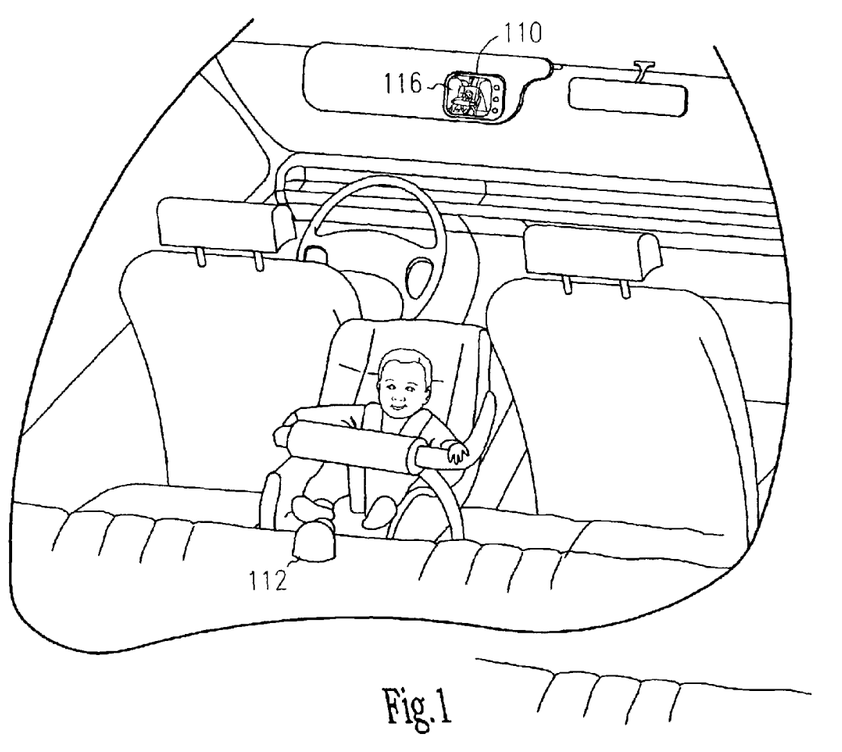
FIG. 1 is a view of an embodiment of the present invention installed within a compartment of a vehicle.

The embodiment of the present invention shown in FIG. 1 has a single display 110 and a single camera 112. The display 110 is operable to at least receive a data signal from the camera 112, for example, such as the data necessary to form a moving image 116 generated by the camera 112. The camera 112 is operable to process a still and/or moving image 116 taken from the camera 112 and transmit the image 116 via a data signal.

Figure 2:
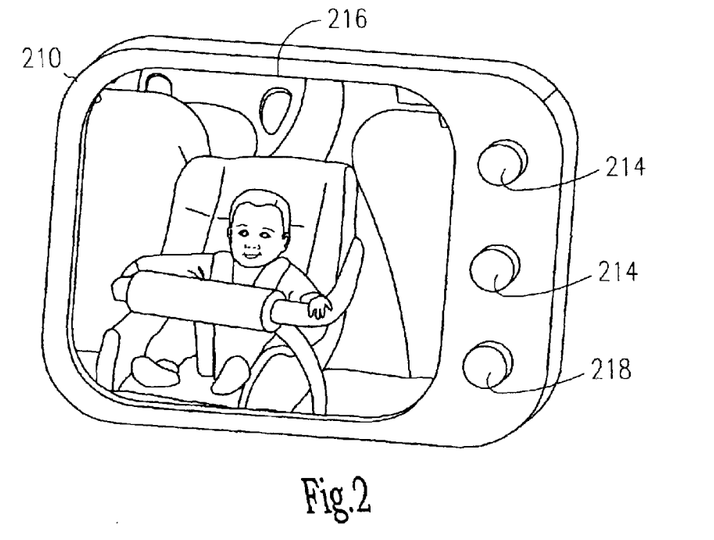
FIG. 2 is a front view of an embodiment of a display for use in the present invention showing a single video image thereon.

FIG. 2 provides a front view of an embodiment of a display 210 that can be utilized in some embodiments of the present invention. For example, the display 210 can be suitable for use as display 110 in the embodiment shown in FIG. 1. The display 210 is operable to provide a video image 216 of a portion of a compartment of a vehicle. This is particularly useful in situations such as: when a driver or passenger is in need of viewing a child that cannot be seen without turning around to view the child, when a driver or passenger is in need of seeing an area of a vehicle compartment that is out of view. In other words, in situations in which the user of the device desires to see an area or object that is not viewable from the current orientation of the user. The system can have one or more controls 214 and 218, such as buttons switches, knobs, and the like, for providing additional functionality to the system such as, for example, power on/off, accessing a menu of functions, zooming in/out, panning, brightness of the image from the camera, aperture, focus of the camera, brightness of the display, contrast, and the like.

Figures 3, 4:
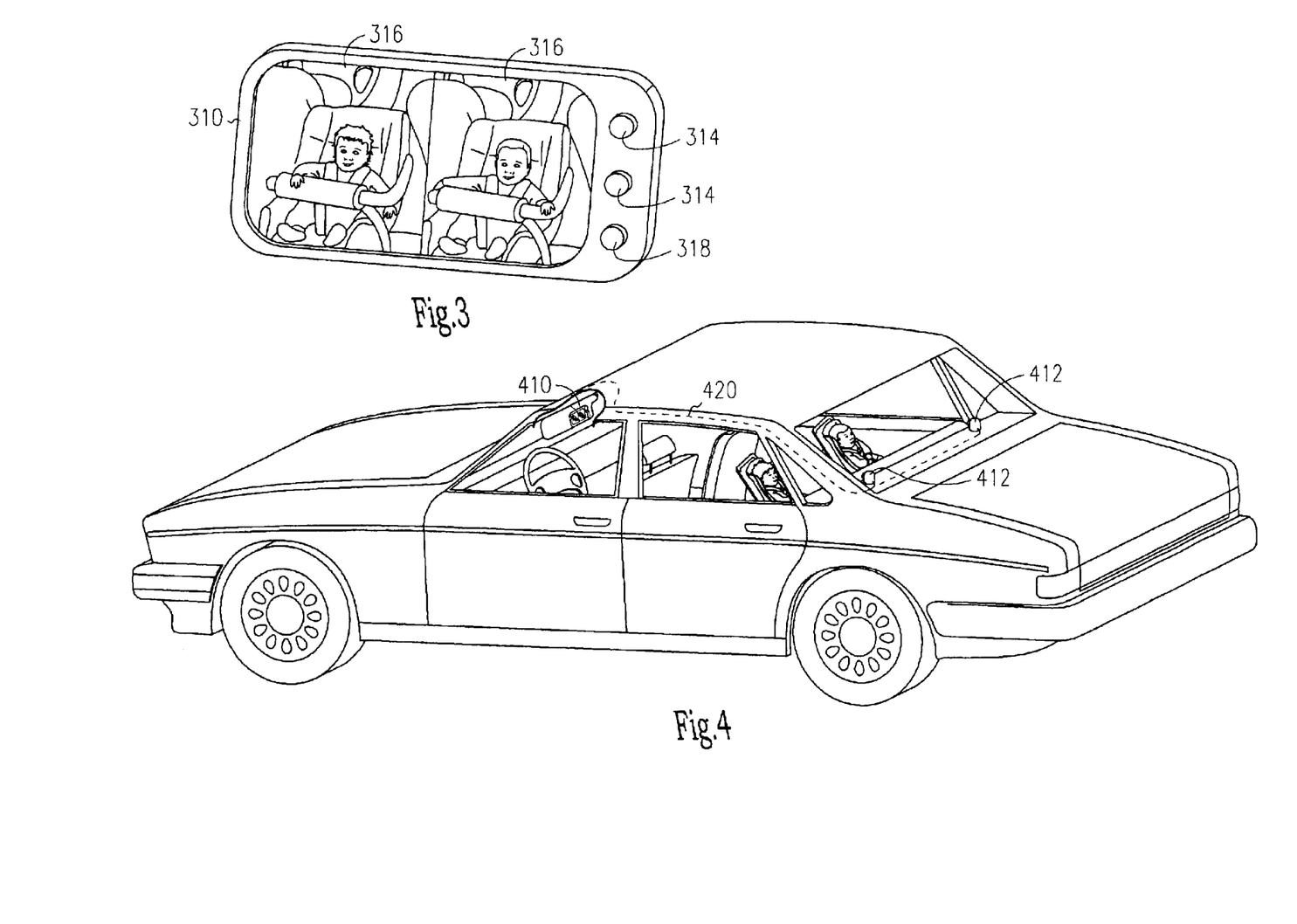
FIG. 3 is a front view of an embodiment of a display for use in the present invention showing two video images thereon in a split screen format.
FIG. 4 is a view of an embodiment of the present invention installed within the vehicle compartment of a vehicle having two cameras.

One embodiment of a display that can be utilized to display images from multiple cameras is shown in FIG. 3. In the embodiment shown, the display 310 is operable to display two video images 316 simultaneously in a split screen format. Additionally, the display 310 can be equipped with one or more controls 314 and 318, similar to those shown and discussed with respect to the embodiment shown in FIG. 2. However, the controls 314 and 318 in this embodiment can also be capable of selecting the mode of viewing (i.e. split screen, picture-in-picture, full screen, cycling of either images or modes, and the like) and/or selecting the image or images 316 to be viewed. One embodiment of a system of the present invention in which such a display can be utilized is shown in FIG. 4.

Specifically, FIG. 4 provides another embodiment of the invention that has a single display 410 and a plurality of cameras 412. In the embodiment shown, the system has two cameras 412 that communicate with a single display 410. Since there is an image 416 generated by each camera 412, it is desirable to allow the display 410 to view both of the images 416. This can be accomplished by any arrangement known in the art. For example, the display 410 can have split screen or picture-in-picture feature to show both images simultaneously, or can manually or automatically cycle through the images. Those skilled in the art will understand through reading this disclosure and practicing the invention, that the selection of the displayed image or images can be accomplished in any manner known in the art, for example, through use of computer hardware, software, plc, or the like. For instance, a cycling functionality can be accomplished by a timer mechanism or can be actuated by the user through a button or other mechanism in communication with the display 412 and/or camera 410. FIG. 4 also illustrates how a hardwired connection structure can be attached to the vehicle. Cable 420 is utilized to connect the two cameras 412 to the display 410 for the transmission of data signals. Those of ordinary skill in the art will understand that the hardwiring of cable 420 can be placed and routed in any suitable location within the vehicle and can be routed within the body of the vehicle so that it cannot be seen or can be mounted in view of the occupants of the vehicle.

Figure 5:
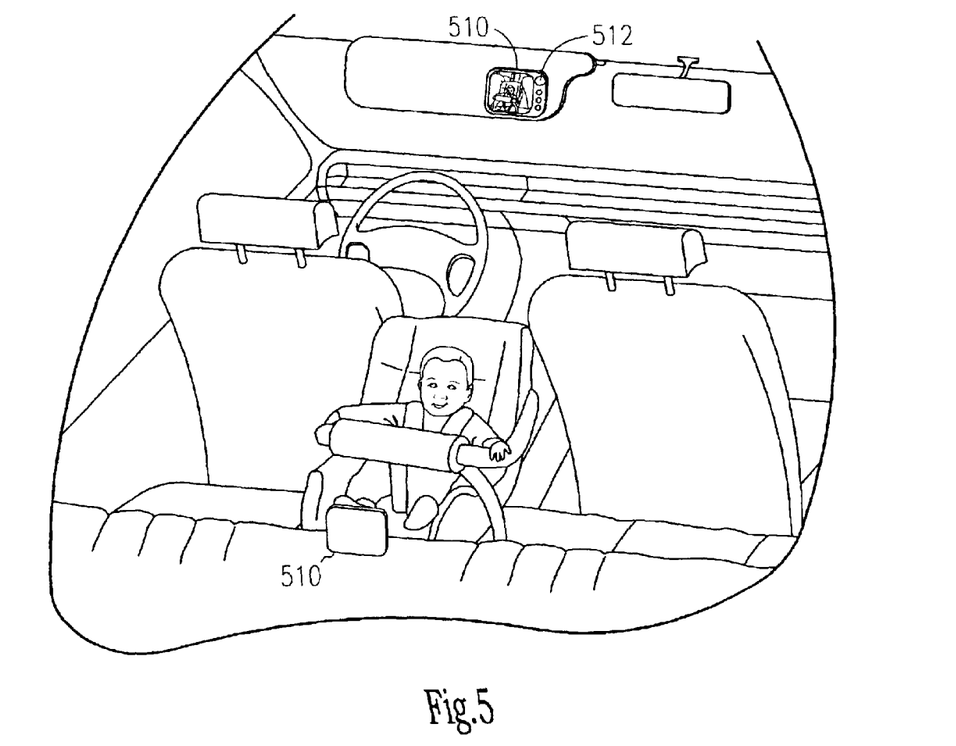
FIG. 5 is a view of an embodiment of the present invention installed within the vehicle compartment of a vehicle with a plurality of units each having a display and a camera.

Another embodiment is shown in FIG. 5, wherein the system includes a plurality of displays 510 and a plurality of cameras 512. In the embodiment shown in FIG. 5, a camera 512 is mounted into each display 510 to provide a first unit and a second unit. The invention would also include embodiments having the camera 512 and display 510 components separate.

In the embodiment shown, the camera 512 of the first unit is communicating with the display 510 of the second unit.

Figure 6:
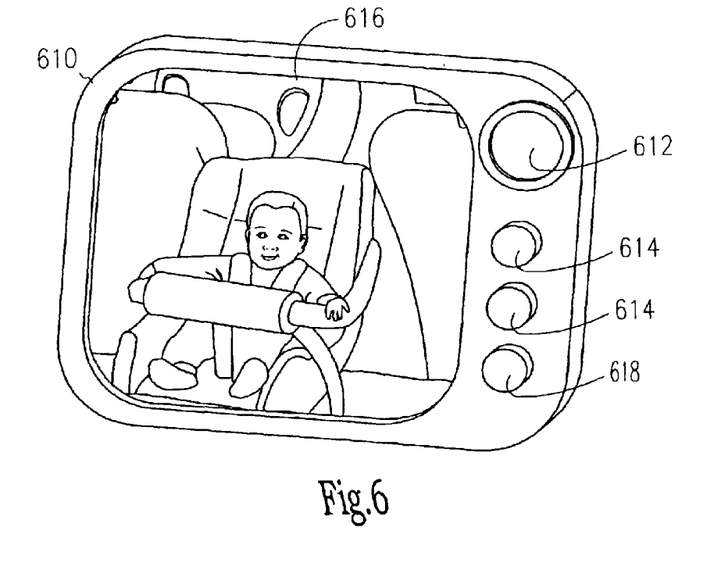
FIG. 6 is a front view of an embodiment of a display for use in the present invention showing a display with a camera integrally mounted thereon.

The display 510 of the second unit can also be communicating with the camera 512 of the first unit, in some applications. Additionally, the camera 512 of the second unit is communicating with the display 510 of the first unit and the display 510 of the first unit can also be communicating with the camera 512 of the second unit, in some applications. In this way, the user viewing the first display 510 can see the video image 516 generated by the camera 512 of the second unit and the user viewing the display 510 of the second unit can see the video image 516 generated by the camera 512 of the first unit. This embodiment is desirable, for example, when a driver would like to not only see the child in the back seat of the vehicle, but also have the child be able to see the driver. The driver using this embodiment has the ability to see what the child is doing and to interact with the child without having to turn around. One embodiment of an integrated unit that can be utilized with the present invention, for example, as one of the first or second units housing a display 510 and camera 512 is shown in FIG. 6. As shown, the camera 612 is integrated into the display 610.

Figure 7:
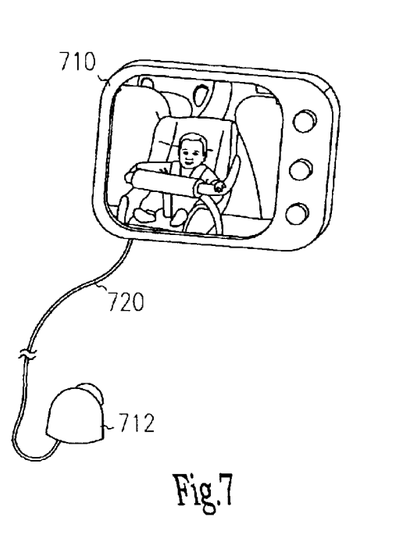
FIG. 7 is a view of an embodiment of the present invention utilizing a hardwired connection structure installed in a vehicle.
Figure 8:
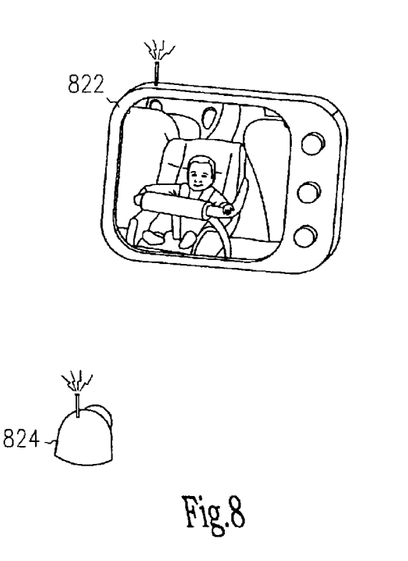
FIG. 8 is a view of an embodiment of the present invention utilizing a carrier wave connection structure installed in a vehicle.

Those of skill in the art should understand from reading this disclosure that any manner of transferring data signals may be utilized with the present invention. For example, two forms of connecting the components of the system are shown in FIGS. 7 and 8. In FIG. 7, a hardwired connection, such as that shown in FIG. 4 is illustrated. The display 710 and camera 712 are connected by a cable 720 allowing for data signals to be passed through the cable 720 from the camera 712 to the display 710 and/or from the display 710 to the camera 712. Examples of suitable connection structures include a hardwired connection, such as by co-axial cable or fiber optics and the like.

In FIG. 8, a carrier wave transmission structure is illustrated wherein the display 822 is equipped with a receiver or transceiver and camera 824 is equipped with a transmitter or transceiver for the transmission of data signals between the display 822 and camera 824. The connection between the display and camera can be any connection structure known in the art and can vary depending upon the specific application in which the invention is to be utilized. Examples of suitable connection structures include connection by carrier wave technology, such as by infrared, Bluetooth, radio frequency, and the like.

Figure 9:
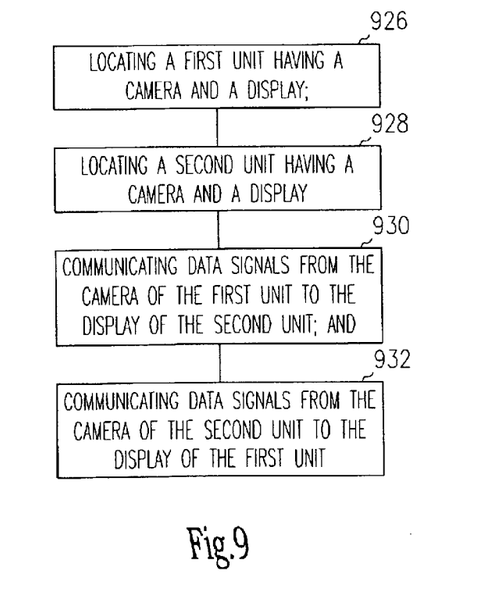
FIG. 9 is a block diagram of an embodiment of a method of monitoring a vehicle.

The present invention also includes a method of monitoring a vehicle compartment. One embodiment of such a method is provided in FIG. 9. The method of this embodiment includes: locating a first unit having a camera and a display in block 926, locating a second unit having a camera and a display in block 928, communicating data signals from the camera of the first unit to the display of the second unit in block 930, and communicating data signals from the camera of the second unit to the display of the first unit in block 932. The method can also incorporate the steps of communicating data signals in real time, operatively coupling the first unit to the second unit such that the camera of the first unit and the display of the second unit can transmit and receive data signals from each other and such that the camera of the second unit and display of the first unit can transmit and receive data signals from each other, and producing a video image on the first display and second display.

The type of display utilized with the present invention can be any suitable display as the same will be known and understood by one of ordinary skill in the art upon reading this disclosure. For example, a flat screen video monitor would be particularly suitable due to its compact size. It should be understood by those of ordinary skill in the art that the embodiments of the invention can have a plurality of monitors, if desired. For example, it may be desirable to have a monitor for the driver and an additional monitor for a passenger so that observation of the compartment can be passed from one occupant of the vehicle to another without having to reposition a display or so that two occupants can view or interact with a child in the compartment.

In addition, in automobiles and in some other vehicles, it is becoming more popular to include integrated display devices such as a computer screen, a television, and/or a video monitor in a vehicle. These devices are utilized, for example, for running graphical navigational programs, receiving and displaying television signals, playing video tapes and digital video recordings and playing computerized games. In vehicles equipped with these devices, it would be advantageous, for example, to be able to view a child in the back seat of the vehicle by transmitting a video image of the child to one of these display devices. It should be noted that the present invention provides embodiments in which these devices can be utilized as displays for use in a vehicle compartment monitoring system. Accordingly, embodiments of the present invention can have a display device integrated or installed into locations such as, for example, a sun visor, the dash board, the windshield, or the steering wheel as those of ordinary skill in the art would understand from reading this disclosure. With respect to these embodiments, the devices can be hardwired to the one or more cameras and/or one or more displays, or may make use of carrier wave technology to transmit data signals to and/or from an integrated display device.

In the various embodiments the one or more displays and/or one or more cameras can be removably positionable. That is, the display can be positioned in any number of locations, for example, in the forward cabin or compartment of a vehicle, e.g. removably attached to a dashboard or rearview mirror, such that the display is forward of a driver and so that the driver's eyes and focus stay forward. Further, in the various embodiments of the present invention, the placement of the display can be in any suitable place within the vehicle and the display can be freely held, such as incorporated in a personal digital assistant (PDA), fixedly attached, releasably positionable, or integrally formed with the vehicle. Likewise, the one or more cameras can be positioned in any number of locations, for example, in the rear passenger cabin or compartment of a vehicle, e.g. removably attached to a backseat or other surface to monitor a rear-facing baby in the backseat. The one or more cameras can also be removably attached to a portion of a front seat or other surface facing rearward to monitor forward-facing occupants in the rear passenger cabin or compartment of a vehicle. According to the various embodiments of the invention, the fact that the one or more displays and/or one or more cameras are removably positionable is useful for removing the items to reduce the likelihood of theft and is useful for repositioning the items. For example, the vehicle monitoring system can be locked in the trunk of a vehicle or carried away from the vehicle when the vehicle is parked on a city street, parking garage, or other potential theft environment. Further, with the present invention the vehicle monitoring system can easily be transferred and used in another vehicle.

The data signals can also be transmitted to and/or from the devices by any manner known in the art, such as by a transmitter-receiver arrangement or a transceiver-transceiver arrangement, for example. As one of ordinary skill in the art will understand upon reading this disclosure, the type of transmission structure can be dependent upon the features that the camera and display have. In some embodiments, for example, if the system has one or more cameras without any of the optional features described herein where control signals are used to adjust the camera, such as zooming or panning capabilities, the camera will not need a transceiver, but can be equipped with a transmitter, to transmit the video image data signal to the display and the display can be equipped with a receiver for receiving the data signal from the transmitter connected to the camera.

In other embodiments, if functions wherein signals need to be sent to the one or more cameras, such as for zooming and panning capabilities, the camera and display can each be equipped with a transceiver, or transmitter and receiver, so that controls connected to the display can send control signals to the camera instructing the camera to provide functions such as zooming or panning. In such embodiments, the display can send control signals, or instructions, to the camera to pan horizontally, to pan vertically, to pan in a combination of the two panning axial directions, or to zoom in and out. According to the teachings of the present invention, this structure can be achieved by having a transceiver integrated with or connected to the display. The camera can also still send the video image signal data to the display for viewing. It should be noted that the controls can be integrated into the display or camera, or can be connected thereto by connection mechanisms, for example hardwired or carrier waves, however, the invention is not limited to these examples. Additionally, the transceivers, transmitters, and receivers can be integrated into the display and/or camera or can be connected to the display or camera.

The one or more cameras utilized in the present invention can be any suitable camera or cameras known in the art and can be of any size and can produce any desired video image quality. The one or more cameras can be fixedly attached or integrated into the vehicle or, in some embodiments, to the display. In some embodiments, as described above, each camera can be optionally provided with the capability to zoom in and out and to pan horizontally, diagonally, and/or vertically.

The above features can be manually operable or can be automated through the use of one or more motors. For example, in embodiments such as the ones shown in FIGS. 2, 3, and 6–8 the display can be equipped with one or more buttons or other mechanisms known in the art that can be utilized to send instructions, for example to the camera to automate camera movement for processes such as zooming or panning. Those of ordinary skill in the art shall understand from reading the disclosure that the one or more mechanisms need not be integrated into the display as shown, but rather can be operable with the display to send instructions to the camera. For example, in some embodiments, control mechanisms are attached or integrated with an armrest or other portion of the vehicle and can communicate with the display or directly to the camera by utilizing any technology known in the art.

Conclusion

Embodiments of the present invention provide a device having a camera and a display for viewing a video image of occupants and contents in a vehicle. In the various embodiments, the vehicle monitoring system can be portable, removably positioned, fixedly attached, or integrated into the vehicle. Likewise, the camera and display components can be physically connected or can be equipped with a transmitter and receiver for transmitting the video images from the camera to the display. Additionally, it is contemplated by the claims of this invention that the system can be comprised of more than one camera and can also be comprised of more than one display.

Although specific embodiments have been illustrated and described herein, it will be appreciated by those of ordinary skill in the art that any arrangement which is calculated to achieve the same purpose can be substituted for the specific embodiments shown. This application is intended to cover any adaptations or variations of the present invention. It is to be understood that the above description is intended to be illustrative, and not restrictive. Combinations of the above embodiments, and other embodiments, will be apparent to those of skill in the art upon reviewing the above description. The scope of the invention includes any other applications in which the above systems, devices, and methods are used. The scope of the invention should be determined with reference to the appended claims, along with the full scope of equivalents to which such claims are entitled.

What is claimed is:

1. A vehicle compartment monitoring system, comprising:
a portable display which can be removably positioned within a compartment of a vehicle, where the display can be attached to and removed from a surface of the compartment without altering the surface;
a portable camera removably positioned within the compartment of the vehicle and operable to transmit data signals, where the camera can be attached to and removed from a surface of the compartment without altering the surface; and
means for relaying data signals from the camera to the display.

2. The vehicle compartment monitoring system of claim 1, wherein the portable display is removably positioned on a dashboard of a forward passenger compartment of the vehicle.

3. The vehicle compartment monitoring system of claim 2, wherein the portable display is removably positioned on a visor of the forward passenger compartment of the vehicle.

4. The vehicle compartment monitoring system of claim 3, wherein the portable display is removably positioned on a rearview mirror of a forward passenger compartment of the vehicle.

5. The vehicle compartment monitoring system of claim 1, wherein the portable display is integrated as a windshield display of the forward passenger compartment of the vehicle.

6. The vehicle compartment monitoring system of claim 1, wherein the portable camera is controllable from the display and operable to zoom in and out and pan horizontally, diagonally, and vertically in order to enlarge and reduce an image on the display and to adjust viewing.

7. The vehicle compartment monitoring system of claim 1, wherein the portable camera is removably positioned on a back seat of a rear passenger compartment of the vehicle to view a rearward facing childseat.

8. A vehicle compartment monitoring system, comprising:
a portable display releasably positionable on a number of different surfaces within a compartment of a vehicle, wherein the display can be interchanged between different vehicles without altering an original configuration of a given vehicle;
a first portable camera releasably position able on a number of different surfaces within the compartment of a vehicle and provided to transmit data signals, where the first camera can be interchanged between different vehicles without altering the original configuration of the given vehicle;

a second portable camera releasably positionable on a number of different surfaces within the compartment of a vehicle and provided to transmit data signals, where the second camera can be interchanged between different vehicles without altering the original configuration of the given vehicle;

a first transceiver connected to the first portable camera operable to transmit and receive data signals with the display;

a second transceiver connected to the second portable camera operable to transmit and receive data signals with the display; and a third transceiver connected to the display operable to transmit and receive data signals with the first and second camera.

9. The compartment monitoring system of claim 8, wherein the portable display is releasably positionable to interchangeably be positioned on a dashboard and a rearview mirror.

10. The compartment monitoring system of claim 8, wherein the first and second cameras are releasably positionable to interchangeably be positioned on a rear passenger cabin window and a backseat.

11. The compartment monitoring system of claim 8, wherein the display can provide a split screen and picture-in-picture to show an image received by the first camera and the second camera simultaneously.

12. The compartment monitoring system of claim 8, wherein the display automatically cycles between images from the first camera and the second camera.

13. The compartment monitoring system of claim 12, wherein a user manually actuate the display to select between images from the first camera and the second camera.

14. A multiple object monitoring system for use in a vehicle, comprising:

a first camera;

a second camera;

a first display; and wherein each camera is operable to transmit data signals to the first display and the first display is operable to receive the data signals the first display includes one or more controls for selection of which data signal to provide on the first display.

15. The multiple object monitoring system of claim 14, wherein the one or more controls of the first display provides for selection between a split screen, picture in picture, full screen, and cycling display of a first video image from the first camera and a second video image from a second camera.

16. The multiple object monitoring system of claim 15, wherein the first display is operable to switch from displaying the first video image to displaying the second video image based on a timer.

17. The multiple object monitoring system of claim 15, wherein the first display is operable to display the first and second video images simultaneously.

18. The multiple object monitoring system of claim 14, wherein the system further comprises a second display and wherein the first camera and the first display form a first unit and wherein the second camera and the second display form a second unit and wherein the camera component of the first unit is operable to transmit and receive control and data signals with the display component of the second unit; and wherein the camera component of the second unit is operable to transmit and receive control and data signals with the display component of the first unit.

19. A method of forming a vehicle monitoring system, comprising;

removably positioning a first a portable camera and a first portable display within a forward passenger compartment of a vehicle, where the first portable camera and the first portable display can be removed from a surface of the vehicle without altering the surface;

removably positioning a second a portable camera and a second portable display within a rear passenger compartment of a vehicle, where the second portable camera and the second portable display can be removed from a surface of the vehicle without altering the surface;

operatively coupling the first portable camera in the forward passenger compartment to the second portable display in the rear passenger compartment so that an occupant in the rear passenger compartment can view an image from the first portable camera on the second portable display; and operatively coupling the second portable camera in the rear passenger compartment to the first portable display in the forward passenger compartment so that an occupant in the forward passenger compartment can view an image from the second portable camera on the first portable display.

20. The method of claim 19, wherein removably positioning the first portable display includes removably positioning the first portable display on a dashboard of the forward passenger compartment of the vehicle.

21. The method of claim 19, wherein removably positioning the first portable display includes removably positioning the first portable display on a visor of the forward passenger compartment of the vehicle.

22. The method of claim 19, wherein removably positioning the first portable display includes integrating the first portable display into a windshield of the forward passenger compartment of the vehicle.

23. The method of claim 19, wherein removably positioning the first portable display includes removably positioning the first portable display on a rearview mirror of the forward passenger compartment of the vehicle.

24. The method of claim 19, wherein removably positioning the second camera includes removably positioning the second camera on a back seat of the rearward passenger compartment of the vehicle and facing forward to view a rearward facing childseat, and includes removably positioning the second camera on a front seat and facing rearward to view a forward facing childseat.

25. The method of claim 19, wherein removably positioning the second camera includes removably positioning the second camera on a side passenger window in the rearward passenger compartment of the vehicle.

26. The method of claim 19, further comprising operatively coupling the first portable display to the second portable camera such that the first portable display can transmit control signals to the second portable camera.

27. A method of monitoring a vehicle compartment comprising;

locating a first camera and a first display within a vehicles, where the first camera and the first display can be removed from a surface of the vehicle without altering the surface to store and to prevent theft of the first camera and the first display, and to transfer the first camera and the first display far use in a separate vehicle;

locating a second camera and a second display within the vehicle, where the second camera and second display can be removed from a surface of the vehicle without altering the surface to store and to prevent theft of the second camera and the second display, and to transfer the second camera and the second display for use in a separate vehicle;

communicating data signals from the first camera to the first and the second display; and communicating data signals from the second camera to the first and the second display.

28. The method of claim 27, wherein communicating data signals includes communicating data signals in real time.

29. The method of claim 27, wherein communicating data signals includes wirelessly communicating data and control signals using a carrier wave technology selected from the group of infrared, Bluetooth, and radio frequency signals.

30. The method of claim 27, wherein the method further includes producing a video image on the first display and second display.

* * * * *